US007506060B2

(12) United States Patent
Anderson

(10) Patent No.: US 7,506,060 B2
(45) Date of Patent: Mar. 17, 2009

(54) TECHNIQUE FOR REDUCING NETWORK BANDWIDTH FOR DELIVERY OF DYNAMIC AND MIXED CONTENT

(75) Inventor: Eric Anderson, Berkeley, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1313 days.

(21) Appl. No.: 10/015,015

(22) Filed: Dec. 11, 2001

(65) Prior Publication Data
US 2003/0110278 A1    Jun. 12, 2003

(51) Int. Cl.
G06F 15/16    (2006.01)
(52) U.S. Cl. .................. 709/231; 709/232; 709/227; 709/228
(58) Field of Classification Search .............. 709/231, 709/232, 227, 228
See application file for complete search history.

(56) References Cited

U.S. PATENT DOCUMENTS

| 6,620,205 | B2 * | 9/2003 | Sequeira | 715/513 |
|---|---|---|---|---|
| 6,820,133 | B1 * | 11/2004 | Grove et al. | 709/238 |
| 6,834,110 | B1 * | 12/2004 | Marconcini et al. | 380/239 |
| 6,839,680 | B1 * | 1/2005 | Liu et al. | 705/10 |
| 6,976,165 | B1 * | 12/2005 | Carpentier et al. | 713/165 |

OTHER PUBLICATIONS

Wetherall, David; Santos, Jonathan. "Increasing Effective Link Bandwidth by Suppressing Replicated Data." Proceedings of the USENIX Annual Technical Conference (NO 98), New Orleans, Louisiana. Jun. 1998.

Muthitacharoen, Athicha; Chen, Benjie; Mazieres, David. "A Low-bandwidth Network File System." In the Proceedings of the 18th ACM Symposium on Operating Systems Principles (SOSP '01), Chateau Lake Louise, Banff, Canada. Oct. 2001.

Tridgell, Andrew; Mackerras, Paul. "The rsync algorithm." The Australian National University, Joint Computer Science Technical Report Series. Jun. 1996.

Gaurav Banga, Fred Douglas & Michael Rabinovich—"Optimistic Deltas for WWW Latency Reduction"—Proceedings of the USENIX 1997 Annual Technical Conference Anaheim CA—Jan. 6-10, 1997—pp. 1-17.

Matthen Delco & Mihut Ionescu—"xProxy: A Transparent Caching and Delta Transfer System for Web Objects"—Computer Science Division—UC Berkeley—pp. 1-15.

Jeffrey C. Mogul, Fred Douglas, Anja Feldmann & Balachander Krishnamurthy—"Potential Benefits of Delta Encoding and Data Compression for HTTP"—pp. 1-14.

J. Mogual, B. Krishnamurthy, F. Douglas, A. Feldman, Y Goland, A. van Hoff & D. Hellerstein—Delta Encoding in HTTP—Jan. 2002—pp. 1-49.

\* cited by examiner

*Primary Examiner*—Tonia L Dollinger
*Assistant Examiner*—Kyung H Shin

(57) ABSTRACT

A technique for reducing network bandwidth for delivery of dynamic and mixed content. When content, such as a web page or other data, is requested, the invention keeps track of at least some of the content that is sent to the recipient. When another request is made for content that includes one or more portions that were already sent, those portions need not be sent again. Instead, identifiers of portions previously sent, such as checksums or signatures, are sent. The recipient uses the identifiers and the previously sent data to reconstruct the requested data locally. Accordingly, the invention provides a unique data compression technique that avoids sending the same data multiple times, even where the data includes dynamic content. Bandwidth is conserved because less bandwidth is required to send the identifiers than the original data.

36 Claims, 4 Drawing Sheets

110

| Identifier 1 402 | Header 302 |
| --- | --- |
| Identifier 2 404 | Static 1 304 |
| Identifier 3 406 | Dynamic 1 306 |
| Identifier 4 408 | Static 2 308 |
| Identifier 5 410 | Dynamic 2 310 |
| . . . | . . . |
| Identifier m 410 | Static n 312 |
| Identifier m+1 412 | Dynamic n 314 |

Fig. 4

TECHNIQUE FOR REDUCING NETWORK BANDWIDTH FOR DELIVERY OF DYNAMIC AND MIXED CONTENT

FIELD OF THE INVENTION

The present invention relates to the field of content delivery via a wide area network. More particularly, the present invention relates to reducing the network bandwidth required to deliver dynamic and mixed content via a wide area network.

BACKGROUND OF THE INVENTION

Due to high traffic volumes on the World Wide Web and limited bandwidth of communication media, traffic bottlenecks can occur. A conventional technique for reducing the level of Internet traffic without reducing the level of service provided involves storing content, such as web pages, in the geographic vicinity of users who may wish to access the content. Thus, servers are typically positioned in various geographic locations.

Web pages accessed via the World Wide Web typically include both static and dynamic content. Static content is information that changes infrequently over time, such as formatting graphics, headings and categories for other information to be displayed by a web page. The technique of storing content at servers in various geographic locations is suitable for web pages that include only static content. This is because static content seldom changes and, thus, the content can be readily duplicated and distributed to the various servers.

Dynamic content changes more frequently. For example, dynamic content includes news articles, advertisements, photographs, current stock prices and so forth. In addition, dynamic content may be specific to a particular user. Thus, dynamic content provides for personalized web pages, such as to display a particular person's bank account balance or stock holdings. However, the technique of storing content at servers in various geographic locations is not generally applicable to dynamic content. This is because the need to repeatedly distribute the frequently-changing content to all of the various servers would tend to increase, rather than reduce, network traffic.

Internet content providers are increasingly providing dynamic content in order to make the content more attractive and useful to web users. Thus, much of the information accessed via the Internet is mixed content. However, because mixed content included both static and dynamic content, the same problems associated with distributing dynamic content occur for distributing mixed content.

Therefore, what is needed is an improved technique for reducing bandwidth requirements for communication media in a wide area network. What is further needed is such a technique which is suitable for reducing bandwidth requirements for communication of dynamic content and mixed content.

SUMMARY OF THE INVENTION

The invention is a technique for reducing network bandwidth for delivery of dynamic and mixed content. When content, such as a web page or other data, is requested, the invention keeps track of at least some of the content that is sent to the recipient. When another request is made for content that includes one or more portions that were already sent, those portions need not be sent again. Instead, identifiers of portions previously sent, such as checksums or signatures, are sent. The recipient uses the identifiers and the previously sent data to reconstruct the requested data locally. Accordingly, the invention provides a unique data compression technique that avoids sending the same data multiple times, even where the data includes dynamic content. Bandwidth is conserved because less bandwidth is required to send the identifiers than the original data.

In one aspect of the invention, a method for content delivery is provided. A piece of content is requested and delimited into one or more portions at a source. An identifier is associated with one or more of these portions of content and sent to a destination. At the destination, the identifier is looked up. If the identifier is found, the associated portion of content is retrieved at the destination; if the identifier is not found, the associated portion of content is received from the source. If the identifier is not found, the identifier and the associated portion of content may be stored at the destination.

In another aspect of the invention, an apparatus for delivery of content data is provided. The apparatus includes a source having a plurality stored pieces of content and a destination coupled to the source via a network. The source receives requests for content, delimits the pieces of content into portions and assigns identifiers to the portions of content. The destination provides the requests for content, receives the identifiers from the source in response to the requests and looks up the identifiers in a look-up table at the destination. When an identifier is found in the table, the destination retrieves an associated portion of content from the table and when the identifier is not found in the table, the destination receives the associated portion of content from the source via the network.

In a further aspect of the invention, a method for content delivery is provided. A piece of content is requested. The piece of content is delimited into one or more portions at a source. An identifier is associated with a selected one of the one or more portions of the content. The identifier or the portion may is sent to the destination. The decision on which to send is made based on information at the source, for example, the identifier may be looked up in an identifier table (also referred to as a "tag table") at the source. If the identifier is not found at the source, the portion is sent to the destination. The identifier is then looked up at the destination.

The identifier and the associated portion of content may be stored in a look-up table at the destination. The look-up table may use a content addressable memory (CAM). The identifier may be computed from data contents of the associated portion of content. Thus, the identifier may be a checksum or a hash value.

The source may send the identifier and wait for an indication from the destination before sending the associated portion of content. Alternately, the source may send the identifier and the associated portion of content and, if the identifier is found at the destination, the destination may interrupt the source's sending of the associated portion of content.

The piece of content may be a web page and may include dynamic, static and/or mixed content. The portions may be of fixed or variable size. Delimiting the pieces of content may be performed by comparing the piece of content to another piece of content and determining which portions are common to both. Alternately, delimiting may be performed based on features contained within the piece of content (e.g., white or blank space).

The piece of content may be assembled at the destination from one or more portions retrieved at the destination and/or one or more portions received from the source.

BRIEF DESCRIPTION OF THE DRAWINGS

FIG. 4 illustrates identifiers associated with content portions in accordance with the present invention.

DETAILED DESCRIPTION OF A PREFERRED EMBODIMENT

Figure 1:
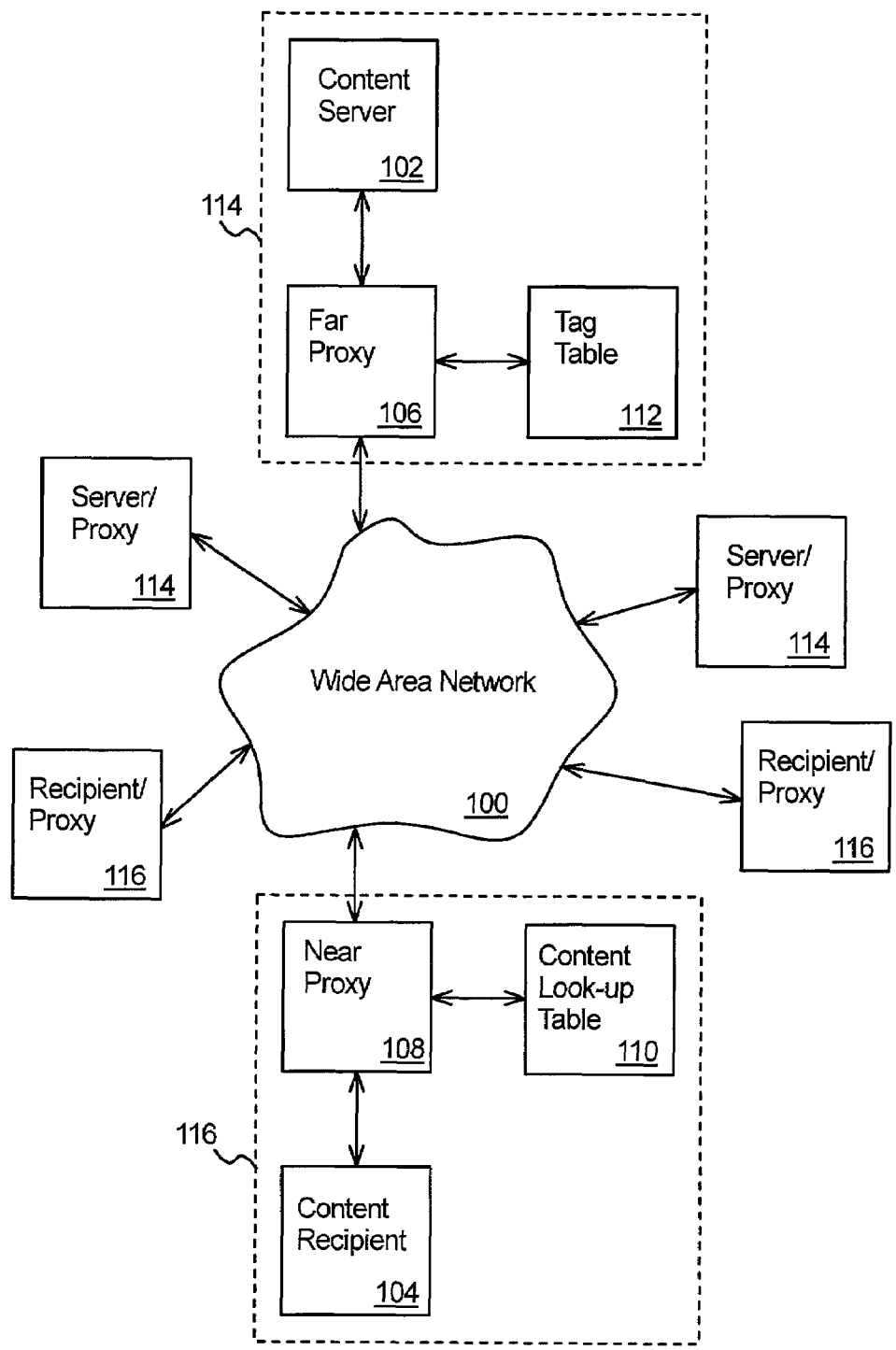
FIG. 1 illustrates a wide area network by which a content server may provide content to recipient in accordance with the present invention.

FIG. 1 illustrates a network 100 by which a content server 102 may provide content to a recipient 104 in accordance with the present invention. The network 100 can be any type of conventional network, however, the invention is directed to wide area networks generally and, more particularly, to the Internet or World Wide Web. The invention generally reduces the amount of traffic in the network 100.

The content server 102 may be a conventional server for the storage of data files to be accessed by networked computers systems. In one embodiment, the server 102 functions as a web server. As such, the server 102 stores web content and responds to requests it receives for access to various web sites and web pages stored by the server 102. The requested web content may be communicated by the server 102 via hypertext transport protocol (http). Accordingly, the content recipient 104 may be implemented as a general-purpose processor and web browser software program.

The server 102 may be coupled to a far proxy server 106 in accordance with the present invention. The far proxy server 106 receives requests for content stored by the server 102 and passes the requests to the server 102 essentially unchanged. Alternately, such requests may be received directly by the server 102 without first passing through the far proxy 106 For content received from the server 102, the far proxy 106 divides the requested data, such as a web page, into smaller portions. The far proxy 106 also assigns identifiers to the portions. For example, the identifier may be checksum, hash or other value computed from the data contents of the associated portion.

The server 102 receives requests for web content that originate from the content recipient 104 via the wide area network 100. The wide area network 100 is coupled to the far proxy 106 and to a near proxy 108. Accordingly, the recipient 104 may pass its requests to the near proxy 108 or directly through the network 100 to the server 102 or far proxy 106. In response to a request, the far proxy 106 provides web content and associated identifiers to the near proxy 108 via the wide area network 100.

A look-up table memory 110 is coupled to the near proxy 108. In one embodiment, the far proxy 106 provides the identifier for a portion of content data to the near proxy 108 before providing the associated content data. The near proxy 106 then looks up the identifier in the look-up table 110. If the identifier is not found in the table 110, the near proxy 108 may receive the associated portion of content data from the far proxy 106 and then store it in the table 110 along with the identifier. The content may also be passed to the recipient 104.

If the identifier is found in the table 110, however, then this means that the associated portion of content data is also stored in the table 110. Accordingly, this content does not need to be sent again by the far proxy 106. Rather, the content may be obtained locally, by the near proxy 108 retrieving it from the table 110. The near proxy 108 may then assemble content data received from the far proxy 106 with content data retrieved from the table 110.

The far proxy 106 may preemptively send content data along with the identifier without instruction from the near proxy 108. For example, the far proxy 106 may determine whether the near proxy 106 is likely to need the content to be sent by looking up the identifier associated with the content in a tag table 112 that is coupled to the far proxy 106. The tag table 112 stores identifiers already sent by the far proxy 106 and, thus, the presence of an identifier in the tag table 112 indicates that the associated content data has been sent to the near proxy 108. If the tag table 112 indicates that requested content has already been received by the near proxy 108, the content generally does not need to be sent again. In some cases, however, the same content may need to be sent again (e.g., where previously sent content has been purged from the look-up table 110). Thus, use of the tag table 112 generally minimizes the amount of network 100 communication required to determine whether the requested content needs to be sent, however, it will be apparent that advantages of the present invention may be achieved without use of the tag table 112.

The assembled content is equivalent to the data requested from the server 102. The content recipient 104 then receives the assembled content from the near proxy 108. Thus, by avoiding sending previously-sent content, the amount of content communicated from the server 102 to the recipient 104 via the network 100 is reduced.

The far proxy 106 and near proxy 108 may each be implemented by a general-purpose computer system, or by specialized hardware, firmware or a combination thereof. Further, the server 102 and far proxy 106 (and optional tag table 112) may be implemented as distinct entities or may be combined into a single entity. For example, a conventional server may be modified to perform the functions of the far proxy 106. Collectively, the server 102 and far proxy 106 (and optional tag table 112) may be referred to as a data "source" 114. Similarly, the data recipient 104, near proxy 108 and look-up table 110 may be implemented as distinct entities or combined into one or more entities. For example, the data recipient 104 may be implemented as a general-purpose computer system that includes a web browser and also performs the functions of the near proxy 108. Collectively, the data recipient 104, near proxy 108 and table 110 may be referred to as a data "destination" 116.

As shown in FIG. 1, one or more additional data sources 114 may be coupled to the network 100. Further, one or more additional data destinations 116 may be coupled to the network 100. Depending upon the implementation, there need not be a one-to-one correspondence of content servers 102 to far proxies 106. Similarly, there need not be a one-to-one correspondence of near proxies 108 to content recipients 104.

The look-up table 110 and tag table 112 may each be implemented by a memory device, such as random access memory (RAM) or dynamic RAM (DRAM). In a preferred embodiment, the tables 110 and 112 are each implemented by a hash table or associative array. A hardware implementation of which is a content-addressable memory (CAM).

Figure 2:
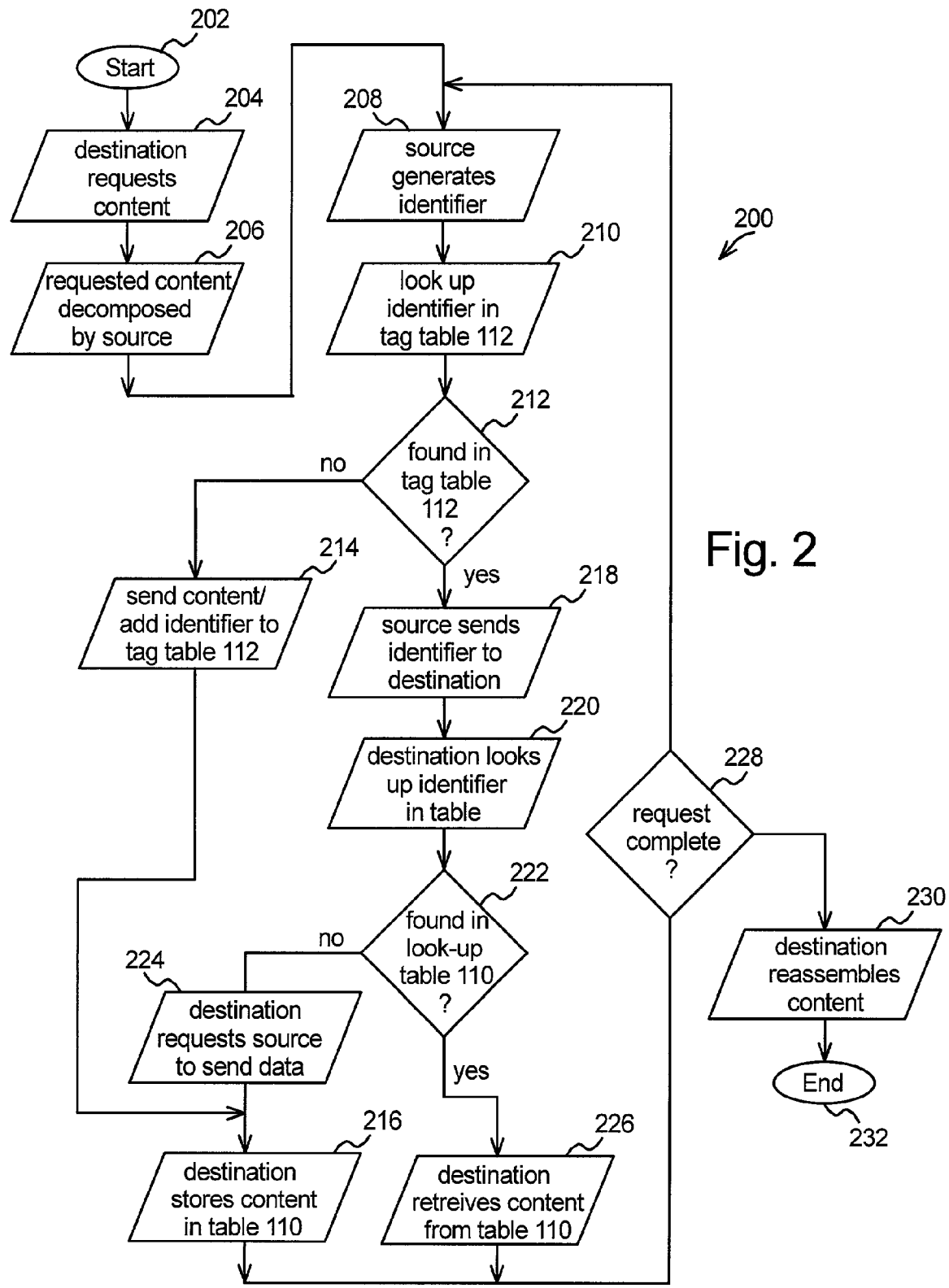
FIG. 2 illustrates a flow diagram for delivery of content in accordance with the present invention.

FIG. 2 illustrates a flow diagram 200 for delivery of content in accordance with the present invention. Program flow begins in a start state 202 and moves to a state 204. In the state 204, the destination 114 (FIG. 1) requests content data, such as a particular web page, from the source 114 (FIG. 1). This may be accomplished by the destination 116 communicating a request to the source 114 via the network 100 in accordance with an appropriate communication protocol (e.g., TCP/IP). Then, in a state 206, the source 114 may divide the requested content into portions.

Figure 3:
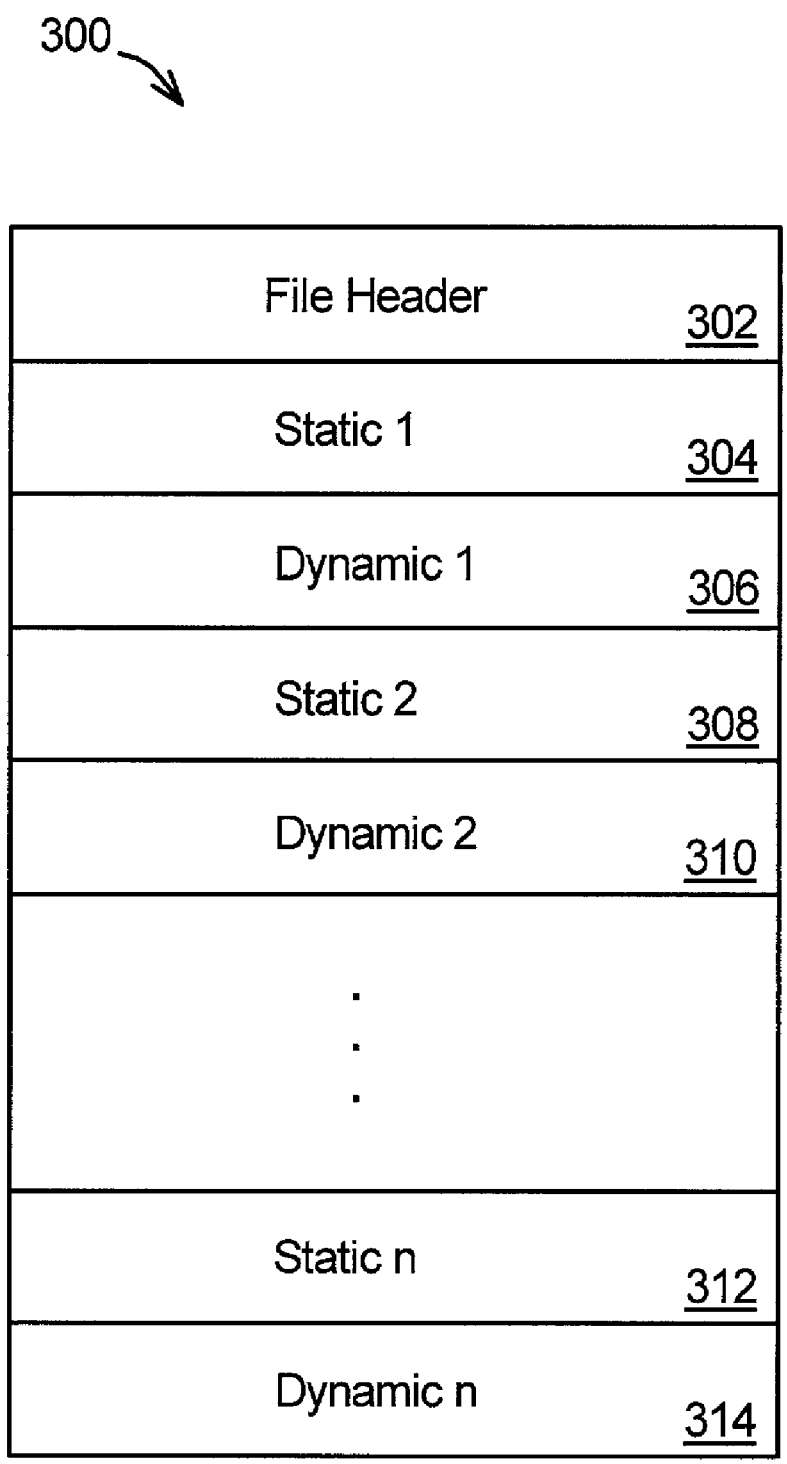
FIG. 3 illustrates a content file, including dynamic and static content which may be communicated in accordance with the present invention.

FIG. 3 illustrates a content file 300, such as a web page, which may be divided into portions by the source 114. The file 300 may include dynamic content only, static content only or dynamic and static content that is intermixed. Thus, in the exemplary file 300 shown in FIG. 3, the file 300 may include a file header 302, portions 304, 308, 312 that contain static content and portions 306, 310, 314 that contain dynamic content. In a preferred embodiment, the source separates the file into its static and dynamic portions. It will be apparent, however, that advantages of the invention may be achieved even where portions include mixed content, Separation of the portions may be accomplished for example, by the source 114 generating the file with the static and dynamic portions delimited. Generally, at a web server, static and dynamic content are stored separately due to their different natures. Accordingly, the source 114 may delimit the portions 304-314 of the file 300 when the source 114 retrieves them from its storage facility.

In a next state 208, the source 114 generates an identifier for a portion of the content. Thus, for example, the source 114 generates a first identifier for the static content portion 304. The identifier may be checksum, hash, or other value computed from the data contents of the associated portion.

Then, in a state 210, the source 114 may look-up the identifier in the tag table 112. If it is not found in the table 112 (in a state 212), this means that the content should be sent again. Thus, program then flow moves to a state 214 in which the identifier may be added to the table 112 and the content and the identifier may be sent to the destination 116. From the state 214, program flow moves to a state 216 in which the content and identifier may be stored in the table 110.

Alternately, if the identifier is not found in the tag table 112, then program flow moves from the state 212 to a state 218. In the state 218, the source 112 communicates the identifier and the portion, e.g., the static content portion 304, to the destination 116. As mentioned, the tag table 112 may be omitted. In which case, the states 210, 212 and 214 may be omitted. Program flow may then proceed directly from the state 208 to the state 218.

The identifier for a content portion should be same each time the identical content portion is sent by the source 114 to ensure that only one table 110 entry is formed the content. Further, the different identifiers should be assigned to different portions of content data to ensure that unintended data is not retrieved from the table 110. Known hash functions, such as MD-5 and SHA-1, have these properties.

Thus, the content it need not be resent each time it is requested; it only needs to be resent when it changes. When the content changes, its identifier will change and, thus, it will not be found in the table 110 until the changed content is sent and added to the table 110.

Next, in a state 220, the destination 116 looks up the identifier in the table 110. A determination may then be made in a state 222 as to whether the identifier is found in the table 110. If the identifier is not found, this indicates that the corresponding content is not stored locally (e.g., in the table 110). Accordingly, in a state 224, the destination 116 may request that the source 114 send the content portion to the destination 116. Then, in the state 216, the destination 116 may store the identifier and the associated content data in the table 110.

FIG. 4 illustrates the table 110 in more detail. Assuming, for example, that the destination 114 receives the identifier 408 (labeled "Identifier 4" in FIG. 4) from the source 114, but does not find the identifier 408 in the table 110, then the identifier 408 may be added to the table 110 along with the associated static content data 308 (labeled "Static 2" in FIG. 4). Thus, as shown in FIG. 4, the content portions 304-314 (FIG. 3) are each stored in association with a corresponding one of identifiers 404-412. In addition, one or more identifiers (e.g., identifier 402) may be associated with a header 302 for a file.

The table 110 need not be arranged according to files. For example, a new entry for a portion of a file may simply be added to the table 110, as needed, without regard to whether or where the rest of that file has been stored in the table 110. Further, an identifier need not be associated with every portion of file, whether the portion is a header, a dynamic content portion or a static content portion. For example, the source 114 may determine that a particular content portion is dynamic and would not be of benefit to store in the table 110. In which case, the source 114 may simply send the content without an associated identifier. Also, more than one identifier may be associated with a particular portion of content. Thus, the table 110 may include identifiers for static portions of content which adjacent to each other in the file or identifiers for adjacent dynamic portions. In which case, the table 110 would likely not include alternating static and dynamic entries, as is shown in FIG. 4.

Returning to the state 220, assume that the destination 116 looks up the identifier in the table 110 (state 220) and that the identifier is found in the table 110 (state 222). This indicates that the associated content need not be sent by the source 114. Rather, the content can be obtained locally (e.g., from the table 110). Thus, program moves from the 222 to a state 226, in which the destination 116 may retrieve the content portion from the table 110.

As a particular example, assume that the content identifier 404 (labeled "Identifier 2" in FIG. 4) is received by the destination 116 in the state 218. And, when the destination 116 looks up the identifier 404, it is found in the table 110 stored in association with the dynamic content portion 306 (labeled "Dynamic 1" in FIG. 4). Thus, the destination 116 may retrieve the associated content portion 306 locally (e.g., from the table 110) rather than from the source 114. As a result, the network 100 (FIG. 1) is not used for communicating the content portion 306, conserving its bandwidth.

The tables 110 and 112 should be purged of stale entries. This may be accomplished, for example, by time-stamping each entry each occasion that it is accessed and deleting those entries that have not been accessed for more that a predetermined period of time. Because older entries are more likely to include information that is no longer useful (e.g., the information has changed or is otherwise obsolete), this will prevent the tables 110 and 112 from occupying excessive memory space unnecessarily. Other techniques for purging entries from a cache memory, e.g., clock, least-recently used (LRU or LRU-K), most-recently used (MRU) are known and may be employed.

From either the state 216 or the state 226, program flow moves to a state 228. In the state 228, a determination may be made as to whether additional data portions are required in order to complete the request. This may be accomplished in a number of different ways. For example, a hand-shaking communication routine between the source 114 and the destination 116 may be utilized. Alternately, the source 114 may simply continue sending identifiers and content data until the request is complete. When the request is for a web page, for example, then the request may be complete once the requested web page is completely loaded onto the recipient 104 (FIG. 1).

Assuming the request is not yet complete, program flow may return to the state 208 where the source 114 may generate another identifier for a next content portion (e.g., for the web page).

Once all content portions required to fill the request have either been received from the source 114 or retrieved from the table 110, a positive determination is made in the state 228. The request may be complete, for example, when a requested web page is completely loaded onto the recipient 104 (FIG. 1).

Next, in a state 230, the destination 116 may reassemble the content portions into the original file that was requested. For example, assuming that the destination 116 requested the content file 300 and obtained all of its portions 304-314 from either the source 112 or the table 110, the destination 114 may then reassemble the portions 304-314 in the state 230. This may be accomplished, for example, by assembling the portions 304-314 in the order in which the portions and/or identifiers were received.

Thus, a data compression technique has been described for reducing the bandwidth required to communicate data, such as Internet content. Rather than sending requested data multiple times, one or more identifiers are sent which uses less bandwidth that would be required to send the original data.

Modifications may be made to the described invention. For example, the steps need not be performed in the order indicated in FIG. 2. For example, the identifiers for all portions of a request may be generated and sent as a group rather than sending them one at a time, as indicated in FIG. 2. Further, rather than waiting until all of the content portions are received before assembling them, the destination 116 may instead assemble the portions as they are received since they may be received from the source 114 and/or retrieved from the table 110 in the order in which they should be assembled.

In the embodiment of FIG. 2, the source 114 may send the identifier and wait until the destination requests the associated content or a next identifier before sending either. To avoid idle periods during communications while the destination is looking in table 110, in another embodiment, the source 114 may continue sending data unless its sending is interrupted by the destination 116. More particularly, the source 114 may send an identifier and, then, the associated content portion without waiting for a response from the destination 116. Thus, the content portion may be sent concurrently with the destination 116 looking up the identifier in the table 110. If the destination 116 finds the identifier in the table 110, then the destination 116 may then notify the source 114 to stop sending the content portion and to start sending the next identifier.

Further, in another embodiment, the identifiers are only sent by the source 114, or only stored by the destination 116, for selected portions of the content. For example, identifiers may be used only for static content and not for certain dynamic content. Because dynamic content may contain sensitive information, such as personal financial information, it may be preferable to avoid storing dynamic content at the destination 116. Thus, for security reasons, only static information may be stored at the destination 116. Further, it is expected that the more bandwidth reduction benefits may be obtained by storing static information than by storing dynamic information. Because of its nature, static information changes less often. Thus, static content stored in the table 110 may be retrieved many times before it becomes stale or obsolete. In contrast, dynamic information is expected to have a shorter useful life if stored in the table 110.

Additional benefits of the invention may be obtained by sharing the table 110 among more than one recipient system 104. This is because the number of accesses to the content in the table 110 may be increased and, thus, network 100 bandwidth will be correspondingly reduced. Further, it is expected that in such an embodiment, static content is more likely to be accessed by different recipients since it is generally not specific to a particular user. In contrast, it is expected that the same dynamic content will be accessed infrequently by different users since it tends to be more user-specific (e.g., dynamic content may include personal financial information).

Some sources 114 may not be able to reliably distinguish static content from dynamic content. This may occur, for example, where an existing server does not permit modification to include such an ability. In which case, the content may be divided into fixed or variable size blocks at the source 114. The blocks will preferably be sized such that some blocks include content that is entirely static, but are not so small that overhead associated with communicating many blocks negates the bandwidth reductions that may be obtained. The optimal size will generally depend upon the composition of the data being communicated, but may be determined experimentally. Preferably, the data is divided based on features contained within the data, such as those that may be indicative of whether the data is static or dynamic, so as to increase the likelihood that identical blocks will be repeated in the requested data. For example, boundaries for white or blank space present in the HTML for a web page may be used as boundaries for the blocks.

In accordance with another embodiment for which the server 102 may not be able to reliably delimit static content and dynamic content, requested pieces of content, such as individual web pages or files, may be compared to each other at the far proxy 106. To accomplish this, a common sub-string algorithm may be employed, such as the diff program. Alternately, the content file can be broken into units, such as lines, blocks or multiple lines. Then, compression techniques, such as Lempel-Ziv, may be employed to identify common units in the content. Content that is common to both files will generally be static content, whereas the remaining content will generally be dynamic content. Accordingly, the data for each requested piece can be decomposed based upon their common portions. For example, a passage of content that is common to the two files, but is bounded by content that is not common to them can be assigned a single identifier for storage in the table 110.

While the foregoing has been with reference to particular embodiments of the invention, it will be appreciated by those skilled in the art that changes in these embodiments may be made without departing from the principles and spirit of the invention, the scope of which is defined by the following claims.

What is claimed is:

1. A method for content delivery, comprising:
requesting a piece of content;
delimiting the piece of content into one or more portions at a source;
associating an identifier with a selected one of the one or more portions of the content, said identifier computed from the selected one of the one or more portions of the content;
sending the identifier to a destination; and
looking up the identifier at the destination and, if the identifier is found, retrieving the associated portion of content at the destination and, if the identifier is not found, receiving the associated portion of content from the source.

2. The method according to claim 1, wherein if the identifier is not found, the method further comprises storing the identifier and the associated portion of content at the destination.

3. The method according to claim 1, wherein the identifier and the associated portion of content are stored in a look-up table at the destination.

4. The method according to claim 3, wherein the look-up table memory comprises a content addressable memory (CAM).

5. The method according to claim 1, further comprising computing the identifier from data contents of the associated portion of content.

6. The method according to claim 5, wherein the identifier is an MD-5 hash value.

7. The method according to claim 6, wherein the identifier is an SHA-1 hash value.

8. The method according to claim 1, wherein the source sends the identifier and waits for an indication from the destination before sending the associated portion of content.

9. The method according to claim 1, wherein the source sends the identifier and the associated portion of content and, if the identifier is found at the destination, the destination interrupts sending of the associated portion of content.

10. The method according to claim 1, wherein the piece of content is a web page.

11. The method according to claim 1, wherein the piece of content includes dynamic and static content.

12. The method according to claim 11, wherein said one or more portions include at least one portion consisting of static content.

13. The method according to claim 12, wherein said one or more portions include at least one portion containing mixed or dynamic content.

14. The method according to claim 13, further comprising assigning a respective identifier to each portion consisting of static content, said respective identifier computed from the assigned portion.

15. The method according to claim 1, wherein said one or more portions are of fixed size.

16. The method according to claim 1, wherein said one or more portions are of variable size.

17. The method according to claim 1, wherein said delimiting is performed by comparing the piece of content to another piece of content and determining which portions are common to both.

18. The method according to claim 1. wherein said delimiting is performed based on features contained within the piece of content.

19. The method according to claim 18, said features including white or blank space to be displayed.

20. The method according to claim 1, further comprising assembling the piece of content at the destination from at least one portion retrieved at the destination and at least one portion received from the source.

21. The method according to claim 1, said sending being via a wide area network.

22. An apparatus for delivery of content data comprising:
a source having a plurality of stored pieces of content, the source for receiving requests for content, delimiting the pieces of content into portions, computing identifiers from said portions of content, and assigning said identifiers to the respective portions of content from which the identifiers are computed; and
a destination coupled to the source via a network, the destination for providing the requests for content, receiving the identifiers from the source in response to the requests and looking up the identifiers in a look-up table at the destination, and wherein when an identifier is found in the table, the destination retrieves an associated portion of content from the table and when the identifier is not found in the table, the destination receives the associated portion of content from the source via the network.

23. The apparatus according to claim 22, the source comprising a server and a far proxy, the server for storing the pieces of content and the far proxy for delimiting portions of the pieces of content.

24. The apparatus according to claim 23, wherein the server comprises a web server.

25. The apparatus according to claim 22, the destination comprising a recipient of content and a near proxy for looking up identifiers received from the source in the table.

26. The apparatus according to claim 22, wherein when the destination receives the associated portion of content from the source, the destination stores the identifier and the associated portion of content in the table.

27. The method according to claim 22, wherein the source sends the identifier and waits for an indication from the destination before sending the associated portion of content.

28. The method according to claim 22, wherein the source sends the identifier and the associated portion of content and, if the identifier is found at the destination, the destination interrupts sending of the associated portion of content.

29. The method according to claim 22, wherein the source attempts to delimit the portions into those which consist of static content and those which contain dynamic or mixed content.

30. The apparatus according to claim 29, wherein the source attempts to delimit the portions into those which consist of static content and those which contain dynamic or mixed content by comparing pieces of content to each other and determining which portions are common.

31. The method according to claim 29, wherein the source attempts to delimit the portions into those which consist of static content and those which contain dynamic or mixed content based on features contained within the piece of content.

32. A method for content delivery, comprising:
requesting a piece of content;
delimiting the piece of content into one or more portions at a source;
associating an identifier with a selected one of the one or more portions of the content; and
determining whether to send the selected one or more portions of content or the identifier to the destination based on information at the source, said determining comprising looking up the identifier at the source and, if the identifier is not found at the source, the method further comprising sending the portion to the destination.

33. The method according to claim 32, further comprising storing the identifier and the associated portion of the content in a look-up table at the destination.

34. The method according to claim 32, further comprising storing the identifier in a table at the source.

35. The method according to claim 32 further comprising:
computing said identifier from said selected one or the one or more portions of the content.

36. The method according to claim 35 wherein said computing comprises computing at least one selected from the group consisting of:
a checksum, hash, or other value that is determinative of said selected one of the one or more portions of the content.

* * * * *

UNITED STATES PATENT AND TRADEMARK OFFICE
CERTIFICATE OF CORRECTION

PATENT NO. : 7,506,060 B2  Page 1 of 1
APPLICATION NO. : 10/015015
DATED : March 17, 2009
INVENTOR(S) : Eric Anderson It is certified that error appears in the above-identified patent and that said Letters Patent is hereby corrected as shown below:

In column 9, line 30, in Claim 18, delete "claim 1." and insert -- claim 1, --, therefor.

In column 10, line 52, in Claim 35, after "selected one" delete "or" and insert -- of --, therefor.

Signed and Sealed this

Thirtieth Day of March, 2010

David J. Kappos
*Director of the United States Patent and Trademark Office*